(12) United States Patent
Gold et al.

(10) Patent No.: US 12,303,762 B2
(45) Date of Patent: May 20, 2025

(54) SELF PROPELLED GOLF CART PAIRED TO GOLF BALL

(71) Applicants: Eliana Gold, Mercer Island, WA (US); Alexis Gold, Mercer Island, WA (US)

(72) Inventors: Eliana Gold, Mercer Island, WA (US); Alexis Gold, Mercer Island, WA (US)

( * ) Notice: Subject to any disclaimer, the term of this patent is extended or adjusted under 35 U.S.C. 154(b) by 200 days.

(21) Appl. No.: 17/302,452

(22) Filed: May 3, 2021

(65) Prior Publication Data
US 2022/0347544 A1 Nov. 3, 2022

(51) Int. Cl.
| | |
|---|---|
| *A63B 55/60* | (2015.01) |
| *A63B 24/00* | (2006.01) |
| *A63B 69/36* | (2006.01) |
| *G05D 1/00* | (2006.01) |
| *B64U 101/05* | (2023.01) |
| *B64U 101/30* | (2023.01) |

(52) U.S. Cl.
CPC ...... *A63B 69/3658* (2013.01); *A63B 24/0021* (2013.01); *A63B 55/61* (2015.10); *G05D 1/0214* (2013.01); *G05D 1/0274* (2013.01); *A63B 2024/0034* (2013.01); *A63B 2024/0053* (2013.01); *B64U 2101/05* (2023.01); *B64U 2101/30* (2023.01)

(58) Field of Classification Search
CPC ............ A63B 55/61; A63B 2024/0028; A63B 2024/0034; A63B 2024/0053; A63B 24/0024; G05D 2201/0204; G05D 1/0274
See application file for complete search history.

(56) References Cited

U.S. PATENT DOCUMENTS

| | | | | |
|---|---|---|---|---|
| 5,533,646 | A * | 7/1996 | Dildine | A63B 47/002 206/315.9 |
| 5,944,132 | A * | 8/1999 | Davies | A63B 69/36 701/470 |
| 11,707,657 | B2 * | 7/2023 | Hsu | A63B 55/60 701/1 |
| 2004/0260467 | A1 * | 12/2004 | Wehrlen | G05D 1/0291 701/36 |
| 2010/0224648 | A1 * | 9/2010 | Nugent | A63B 55/20 221/258 |
| 2017/0108860 | A1 * | 4/2017 | Doane | A63B 57/20 |
| 2018/0173223 | A1 * | 6/2018 | Doane | G05D 1/0255 |
| 2019/0151725 | A1 * | 5/2019 | Bennett | A63B 1/00 |
| 2020/0038724 | A1 * | 2/2020 | Vanlandingham | B60W 30/0953 |
| 2020/0407059 | A1 * | 12/2020 | Kim | G06T 7/70 |
| 2022/0379182 | A1 * | 12/2022 | Hsu | G05D 1/0297 |

FOREIGN PATENT DOCUMENTS

| | | | | | |
|---|---|---|---|---|---|
| CN | 208553018 | U | * | 3/2019 | ......... A63B 37/0003 |
| DE | 102006054933 | A1 | * | 7/2008 | ......... A63B 24/0021 |
| KR | 20200062399 | A | * | 6/2020 | ............. B64D 27/24 |

OTHER PUBLICATIONS

"How does GPS work?" www.eddmaps.org/about/collecting.cfm, Apr. 10, 2015 (Year: 2015).*

* cited by examiner

*Primary Examiner* — Joshua T Kennedy

(57) ABSTRACT

System and method for a golf cart to automatically proceed to the location of a struck golf ball. The system and method allow a golfer to play golf without the need to keep diligent track of the ball. The golf cart determines the location of the struck ball and the proceeds to the location of the ball. This reduces the time needed to find a struck ball and reduces the instances of lost balls.

18 Claims, 9 Drawing Sheets

SELF PROPELLED GOLF CART PAIRED TO GOLF BALL

BACKGROUND

Golf is a sport loved by many. However, lost golf balls and time finding lost golf balls causes slow play. Also, as some golf balls are quite expensive, lost golf balls cause a financial burden. Lastly, rounds that are played in proper time improve the accessibility of golf to others and keep the pace of play at a proper tempo.

SUMMARY

The present disclosure provides a system in one aspect the system comprising: a unit to determine the location of a golf ball, a unit to determine the location of the golf cart, a unit to determine the location of the golf ball after it is struck, a unit to determine a pathway to the golf ball after it is struck, and a mechanical system to propel the golf cart to a location based on the location of the golf ball after it is struck.

In one aspect, in combination with any example system above or below, the unit to determine a pathway to the golf ball after it is struck uses a map of the golf course to determine the pathway to the golf ball after it is struck.

In one aspect, in combination with any example system above or below, the unit to determine a pathway to the golf ball after it is struck provides instructions to the mechanical system to propel the golf cart.

In one aspect, in combination with any example system above or below, the unit to determine a pathway to the golf ball after it is struck receives an input from the unit to determine the location of a golf ball informing the unit to determine a pathway to the location of the golf ball after it is struck.

In one aspect, in combination with any example system above or below, the unit to determine the pathway to the golf ball after it is struck prepares a pathway to the golf ball that avoids at least one of a sand trap and a water hazard.

In one aspect, in combination with any example system above or below, the unit to determine the location of a golf ball uses information from at least one of a transmission receiver and an RFID reader.

In one aspect, in combination with any example system above or below, the unit to determine the location of a golf ball includes a system to determine the flight path of the golf ball.

In one aspect, in combination with any example system above or below, the unit to determine the location of a golf ball receives input from a drone to locate the golf ball after it is struck.

In one aspect, in combination with any example system above or below, the unit to determine a pathway to the golf ball provides instructions to the mechanical system to propel the golf cart to a safe point that is close to the golf ball and the unit to determine the location of a golf ball provides an indication of a location of the golf ball from a current location of the golf cart.

In one aspect, in combination with any example system above or below, the unit to determine a pathway to the golf ball determines the ball is lost, the unit causes the golf cart or a golf bag or a golf bag attached to the golf cart to drop a new golf ball.

In one aspect, in combination with any example system above or below, the unit to determine the location of the golf ball pairs the golf ball with the golf cart.

The present disclosure provides a method in one aspect, the method comprising: determining the location of a golf ball, determining the location of the golf cart, determining the location of the golf ball after it is struck, determining a pathway to the golf ball after it is struck and causing a mechanical system to propel the golf cart to a location based on the location of the golf ball after it is struck.

In one aspect, in combination with any example method above or below, determining a pathway to the golf ball after it is struck includes using a map of the golf course.

In one aspect, in combination with any example method above or below, sending instructions to the mechanical system to propel the golf cart after determining a pathway to the golf ball after it is struck.

In one aspect, in combination with any example method above or below, determining a pathway to the golf ball after it is struck includes receiving an input with the location of a golf ball.

In one aspect, in combination with any example method above or below, determining a pathway to the golf ball includes a pathway that avoids at least one of a sand trap and a water hazard.

In one aspect, in combination with any example method above or below, determining the location of a golf ball includes using information from at least one of a transmission receiver and an RFID reader.

In one aspect, in combination with any example method above or below, determining the location of a golf ball includes using the flight path of the golf ball.

In one aspect, in combination with any example method above or below, wherein determining the location of a golf ball includes using information from a drone to locate the golf ball after it is struck.

In one aspect, in combination with any example method above or below, providing instructions to the mechanical system to propel the golf cart to a safe point that is close to the golf ball based on the determining pathway to the golf ball and providing an indication of a location of the golf ball from a current location of the golf cart based on the determined location of the golf ball.

In one aspect, in combination with any example method above or below, causing the golf cart or a golf bag attached to the golf cart to drop a new golf ball if determining the location of the golf ball determined the ball is lost.

In one aspect, in combination with any example method above or below, pairing the golf ball with the golf cart.

In one aspect, in combination with any example system above or below, the unit to determine a pathway to the golf ball after it is struck uses a map of the golf course to determine the pathway to the golf ball after it is struck.

In one aspect, in combination with any example system above or below, the unit to determine a pathway to the golf ball after it is struck provides instructions to the mechanical system to propel the golf cart.

The present disclosure provides a system in one aspect the system comprising: a unit to determine the location of a golf ball, a unit to determine the location of the golf cart, a unit to determine the location of the golf ball after it is struck, and a unit to determine a pathway to the golf ball after it is struck.

The present disclosure provides a method in one aspect, the method comprising: determining the location of a golf ball, determining the location of the golf cart, determining the location of the golf ball after it is struck, and determining a pathway to the golf ball after it is struck.

The present disclosure provides a computer program product comprising instructions which, when the program is executed by a computer, cause the computer to carry out the steps of any of the methods above or below.

The present disclosure provides a computer-readable medium comprising instructions which, when executed by a computer, cause the computer to carry out the steps of any of the method above or below.

DETAILED DESCRIPTION

Figure 1:
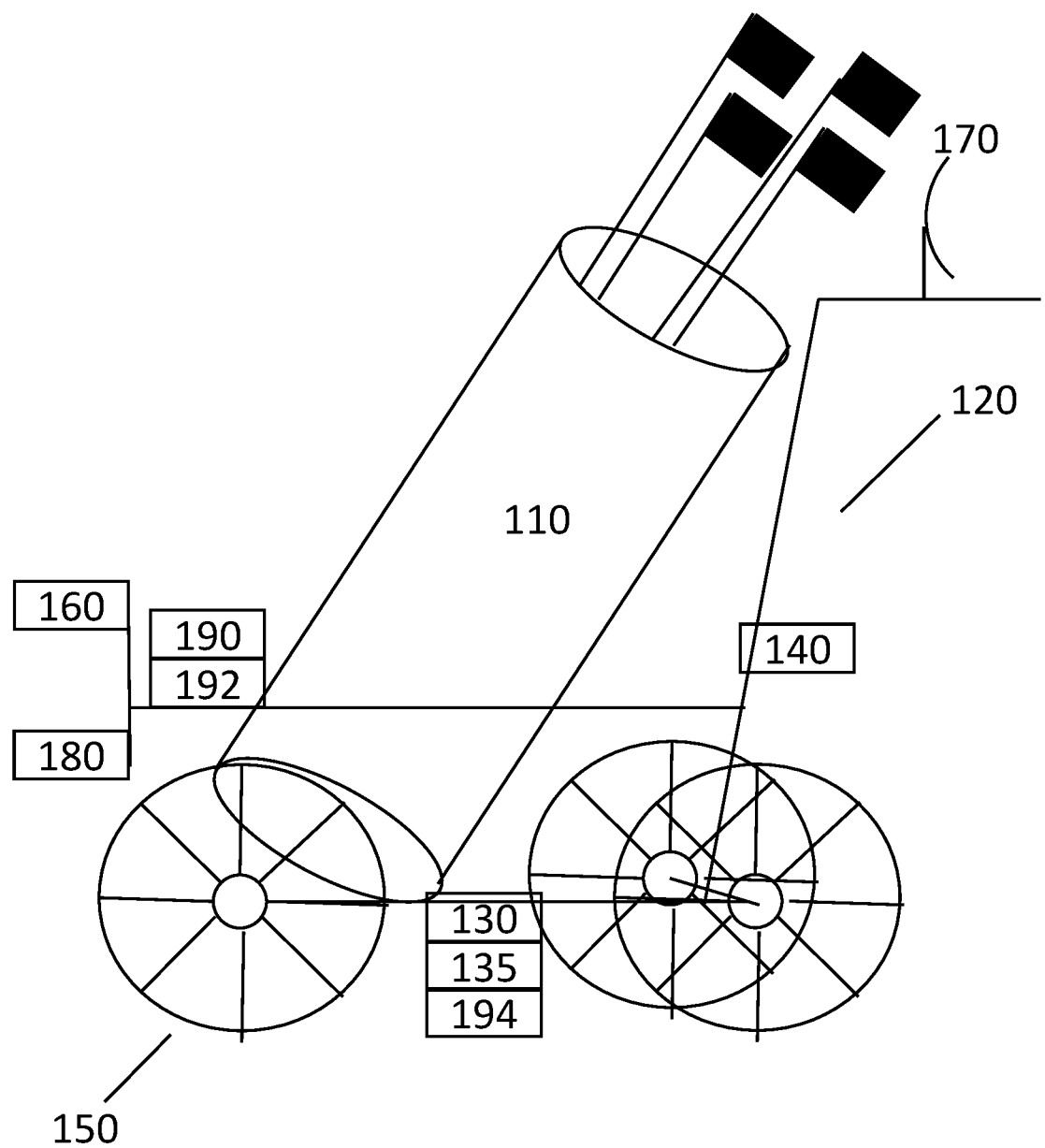
FIG. 1 is a view of a golf bag attached to a golf cart.

FIG. 1 is a view of a golf bag 110 attached to a golf cart 120. The golf cart is driven by hand or by a motor 130 attached to the golf cart 120. Attached to the golf cart 120 is a battery 135, which energizes the various elements attached to the golf cart 120 and a controller 140. The controller 140 is configured to move the golf cart by controlling the motor 130 to move the golf cart 120 and the front wheel 150 to steer the golf cart 120. The steering and motor 130 are part of the mechanical system to propel the golf cart 120. Also attached to golf cart 120 and connected to controller 140 is a camera 160. Screen 170 is also attached to the golf cart. Screen 170 may be a touch screen to allow for interactivity. Radar 180 is further attached to the golf cart 110. Attached to the golf cart is also thermometer 190, wind gauge 192 and dampness detector 194. Alternatively, the golf cart is a driven cart with a steering wheel and seats.

Figure 2:
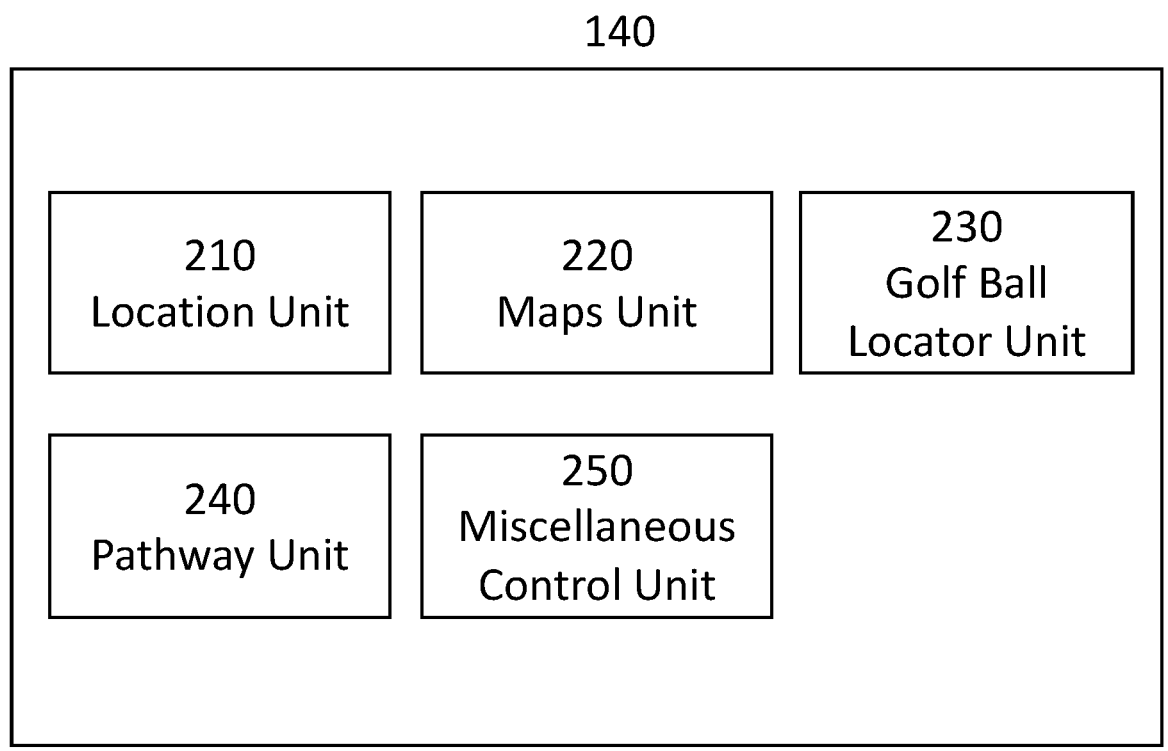
FIG. 2 in a block diagram of a controller for a golf cart.

FIG. 2 is a block diagram of controller 140 for the golf cart 120. Controller 140 includes a maps unit 220 which holds maps of golf courses. Maps unit 220 also holds photos and videos of golf courses relative to their locations on the golf courses. These maps may be in the form of GPS coordinates, photos, videos, drawings or other mapping types. Controller 140 includes a location unit 210 to determine the location of the golf cart 120 and a golf ball 310 before it is struck. The location unit 210 may use various forms of location determination such as GPS and comparing a photo/video of the present location to photos/videos of the location stored in a maps unit 220 to determine the location of golf cart 120 or golf ball 310. The controller also includes a pathway unit 240 which determines a pathway from the golf cart 120 to the golf ball 310.

Controller 140 additionally includes a golf ball locator 230 unit which determines the location of the golf ball 310 after it is struck. The location of a golf ball 310 after being struck may be an exact location or an estimated location.

Figure 3:
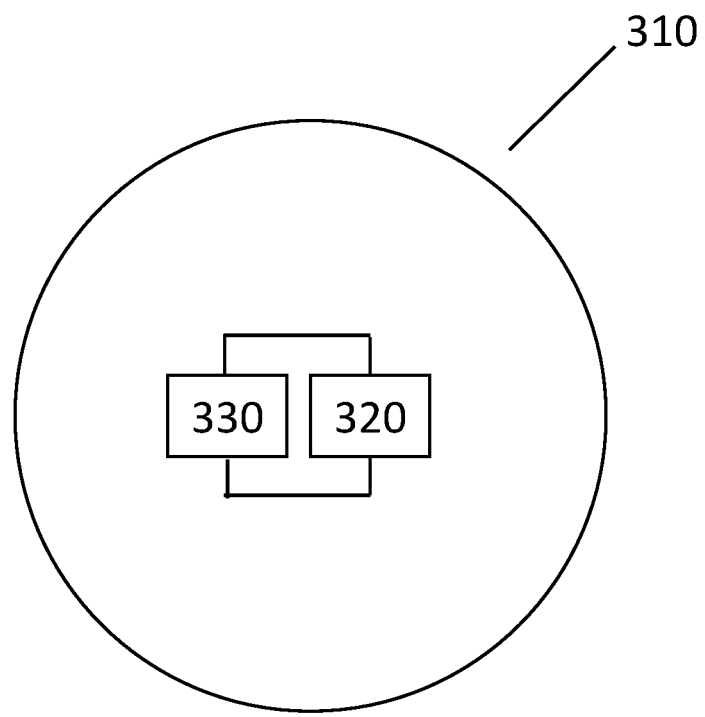
FIG. 3 is a view of a golf ball.

FIG. 3 is a figure of an exemplary golf ball 310. The golf ball 310 in this example includes an embedded transmitter 320 which sends a signal from the ball. In other examples the golf ball includes at least one of an active and a passive RFID transmitter. The transmitters may be connected to an embedded energy unit 330. The energy unit includes at least one of an energy harvesting device or a battery. The system and method may be implemented without a transmitter 320 or energy unit 330 embedded in the golf ball.

The controller 140 automatically or upon command will move to the location of the golf ball 310 after being struck. The golf ball 310 is also paired or tethered to the controller 140. The controller 140 can record the RFID information of golf ball 310 or take photographs of the golf ball 310, to implement a pairing.

Figure 4:
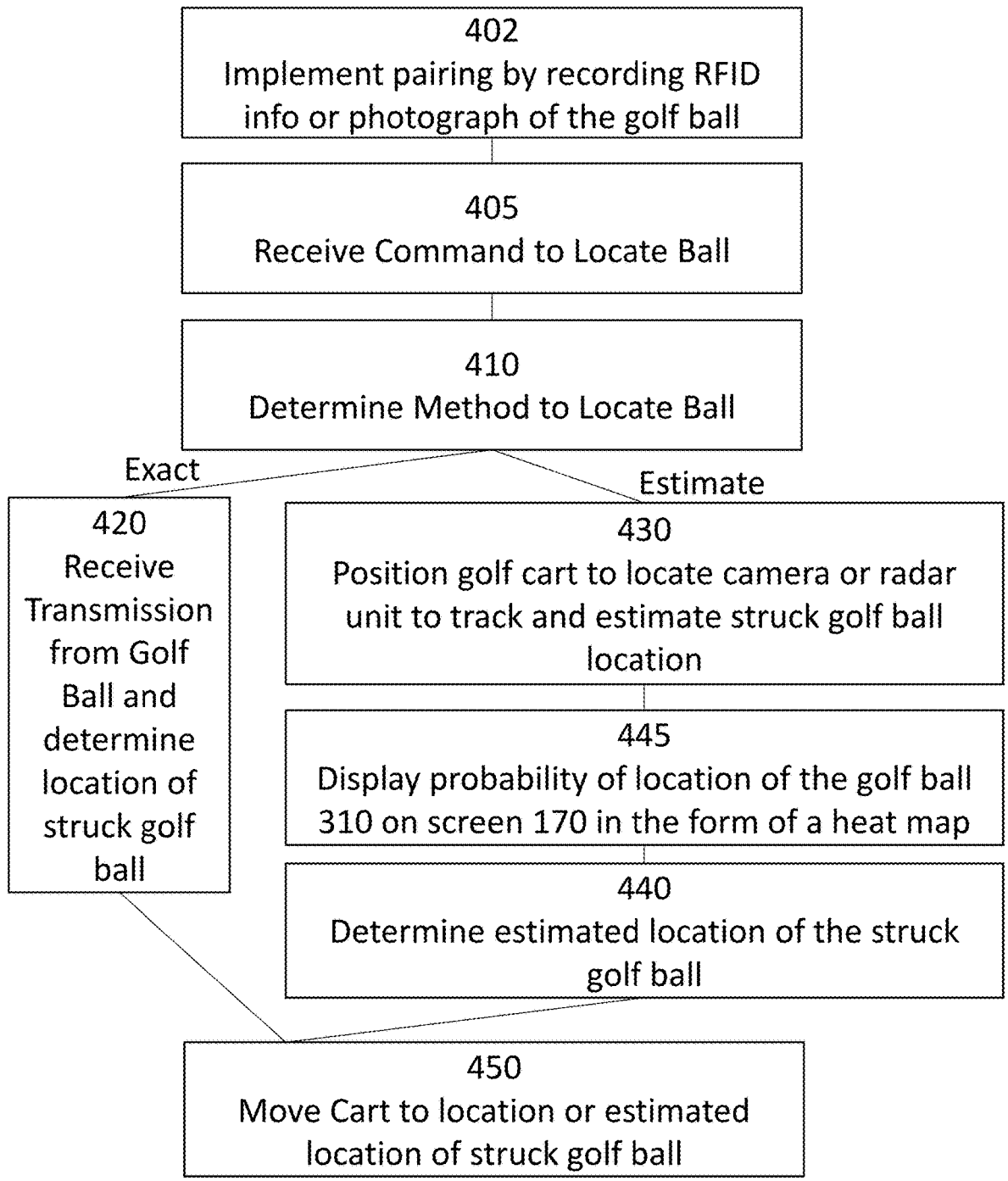
FIG. 4 is a flowchart of a golf ball locater uses to locate a golf ball.

FIG. 4 is a flowchart the golf ball locater unit 230 uses to locate a golf ball 310. Box 402 shows implementing a pairing by recording the RFID information or photograph of the golf ball. Box 405 shows receiving a command to determine the location of a struck golf ball. The command is automatically created if the cart 120 determines that a golf ball, including a paired golf ball, is struck. The command may also be created by a user interacting with screen 170. Box 410 shows the golf ball locator unit 230 determining the method it will use locate a struck golf ball. It can use both methods to provide a more accurate location of the struck golf ball.

If the golf ball locator unit 230 determines it can provide an exact location of the ball it will listen for the transmission 420 from transmitter 320 of golf ball 310. Once the golf ball locater hears the transmission from the golf ball 310 it will determine the location of the golf ball 310.

If the golf ball locator 230 is going to estimate the location of the golf ball, it will prompt a golfer 430 or the golf cart 170 to position the golf cart to properly locate camera 160 or radar unit 180 to track and estimate the resting location of the golf ball 310 after it is struck. With the tracking data from camera 160 or radar 180, the golf ball locator unit 230 determines the estimated location 440 of the struck golf ball 310. The golf ball locator 230 can provide improved estimates of the location of a struck ball by using information such as temperature, wind speed and course dampness. The golf ball locator 230 obtains this information from public information or sensors located on the golf cart 170. The sensors include thermometer 190, wind gauge 192 and dampness detector 194. The estimated location of the golf ball 310 is displayed on screen 170. Additionally, the probability of the location of the golf ball 310 can also be displayed on screen 170, for instance in the form of a gradient or heat map 445.

Once the location is determined or estimated by golf ball locator unit 230, it will inform pathway unit 240 of the location of the golf ball 310. Once the pathway unit 240 has the location of the struck golf ball 310 it will obtain the location of the golf cart 110 from location unit 210 and calculate a pathway to the golf ball 310 with the aid of the information in maps unit 220. It will also display the pathway on screen 170. Automatically or upon command the golf cart 210 will move to the struck golf ball 450 by following the pathway to the golf ball and showing the pathway to the ball on screen 170. The pathway will additionally be calculated to avoid any hazards such as water, bunkers or trees as locations of these hazards are included in the information in maps unit 220. The pathway to the golf ball after it is struck ends at a location very near the golf ball as a user would not want a golf cart 120 to run over the struck golf ball 310.

Additionally, if there is no pathway to the ball, for instance if the ball is in a water hazard, the pathway unit 240 will provide this information on screen 170 as well as a suggested pathway to a location to legally drop a new golf ball. Once at a select location, a miscellaneous control unit 250 of controller 140 will cause the golf cart to drop a golf ball 310 in the suggested location. Alternatively, a user can change the location to drop the new golf ball and the cart will calculate a pathway to the location and drop the new golf ball at the user selected location. The dropped golf ball may be dropped from the golf cart or the golf bag. A new golf ball means a ball that is not currently being played.

Figure 5:
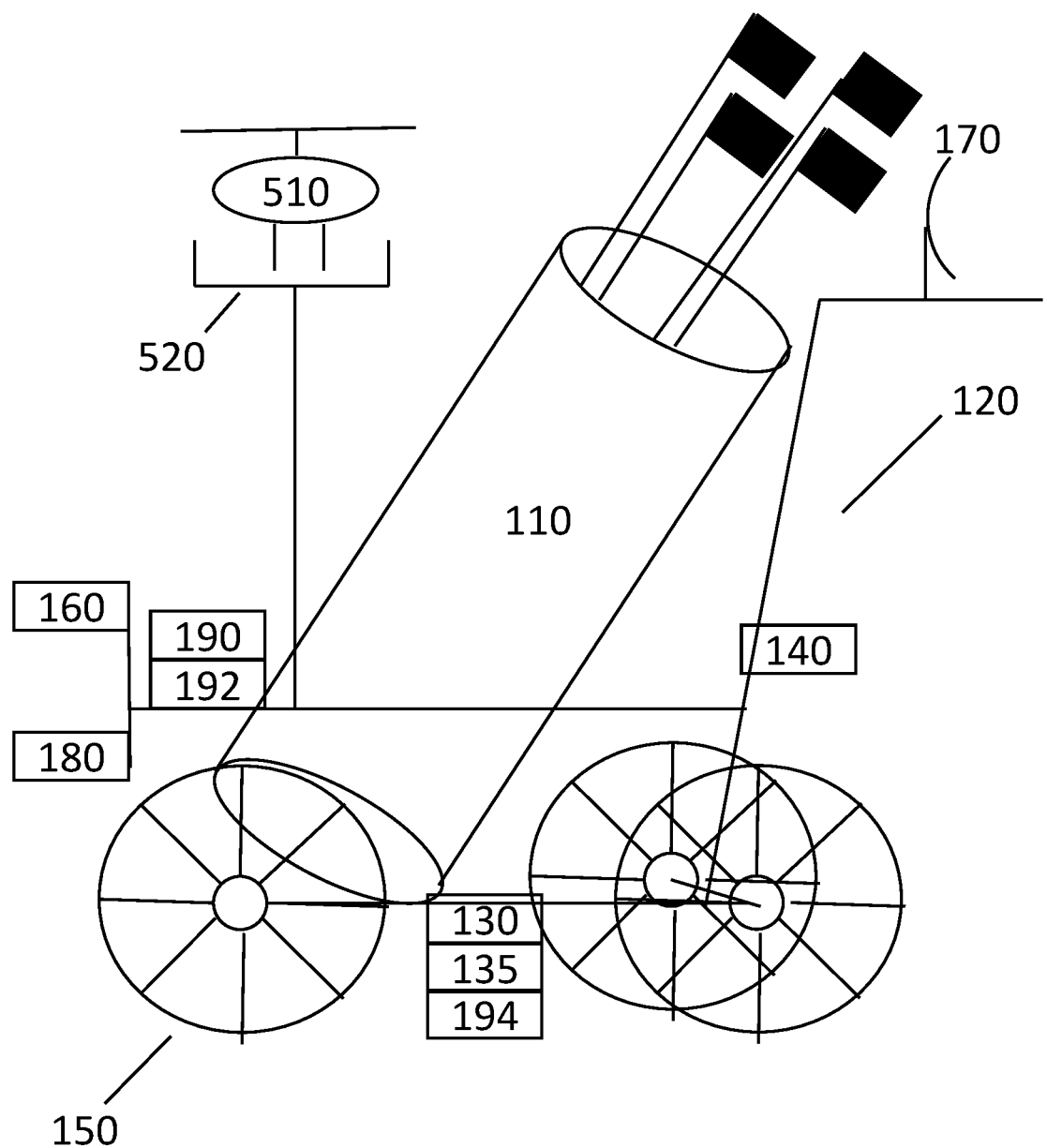
FIG. 5 is an alternate example of a golf cart including a drone and a drone landing pad.

FIG. 5 is an alternate example of golf cart 170 which includes a drone 510 and a drone landing pad 520. The drone 520 can optionally be a flying drone or a land crawler. The drone will include sensors such as a camera and RFID reader. Additionally, controller 140 includes drone controller unit 620. In this example, after golf ball 310 is struck, the drone 510 is sent to precisely determine the location of golf ball 310.

Figure 6:
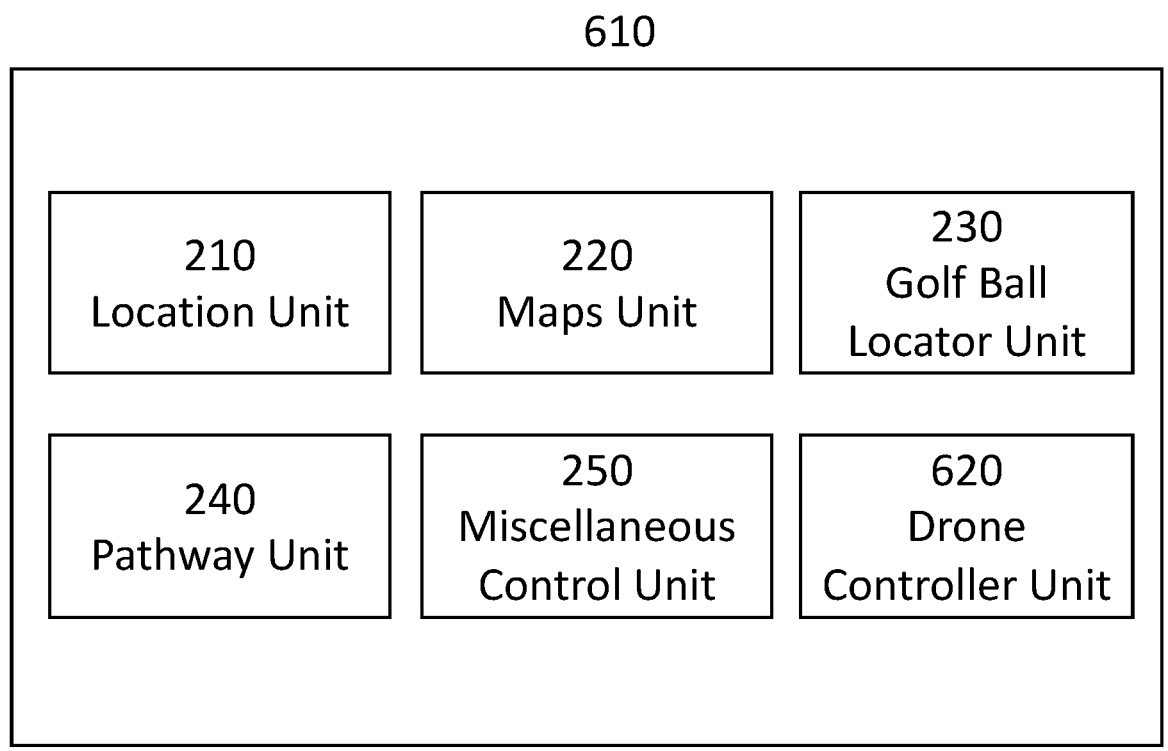
FIG. 6 is a block diagram of an alternative controller of a golf cart.

FIG. 6 is a block diagram of an alternative controller 610 of a golf cart 120. It includes location unit 210, maps unit 220, golf ball locater unit 230, pathway unit 240, miscellaneous control unit 250 as well as drone controller unit 620.

Figure 7:
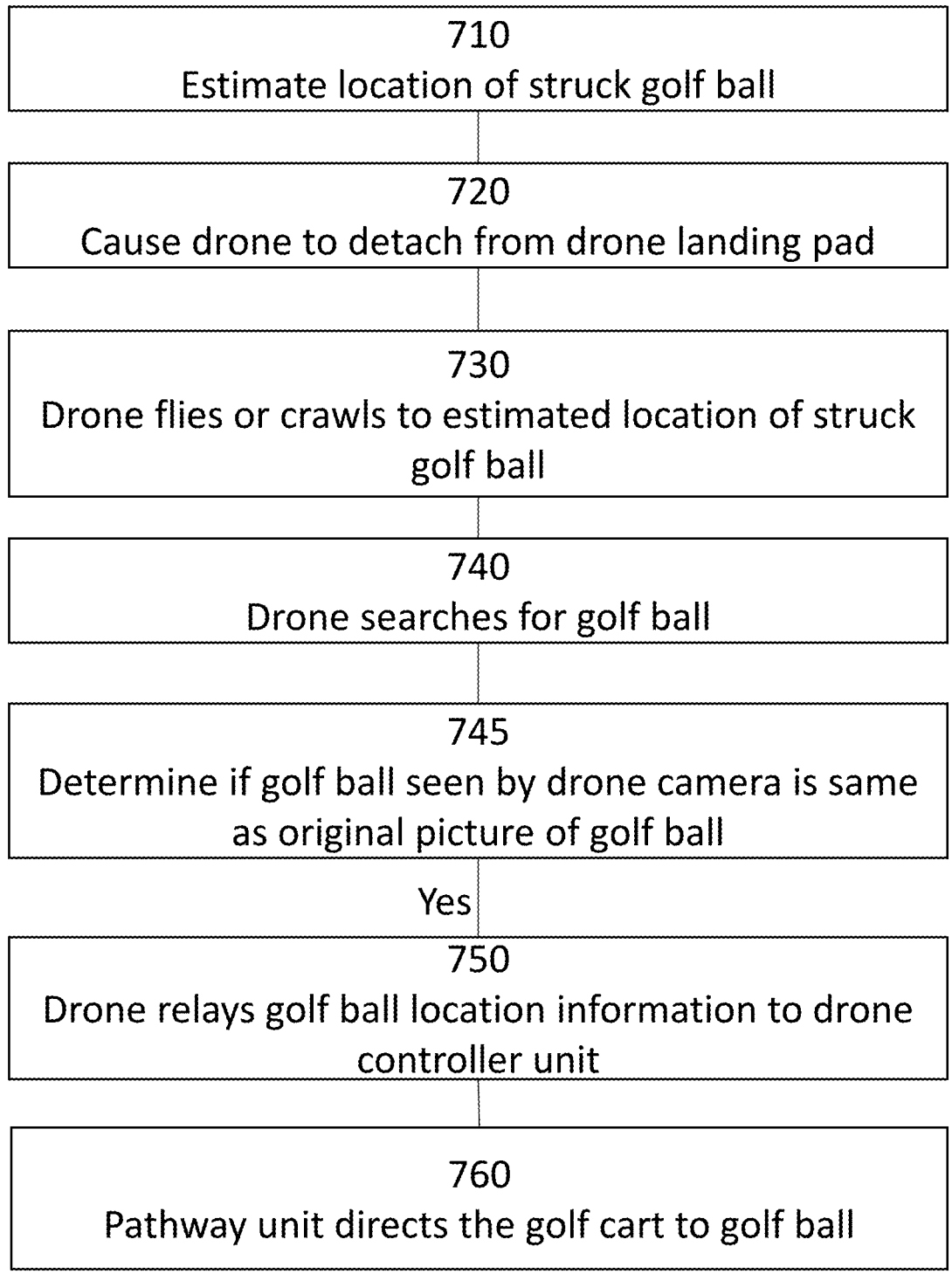
FIG. 7 is a flow chart of using a drone to determine a location of golf ball after it is stuck.

FIG. 7 shows the steps of using a drone 510 to determining the location of golf ball 310 after it is stuck. The golf ball locator 230 estimates the location 710 of the struck golf ball 310. The drone controller unit 620 receives the estimated location information of the struck golf ball 310 from the golf ball locator 230 and causes the drone 510 to detach from drone landing pad 520 720. The drone 510 then flies or crawls to the estimated location of the struck golf ball 730 either autonomously with location information provided by drone controller unit 620 or via active control of drone controller unit 620. Once at the drone 510 arrives at the estimated location, it performs a search 740 for the golf ball 310. This search in one example is a grid search with the middle being the estimated location of golf ball 310. The drone 510 uses a camera to optically detect the ball or an RFID receiver to detect an RFID tag embedded in golf ball 310. A picture from the camera can be used to determine if the ball is same as the photograph of the ball stored in memory through registration or another method. Accordingly, it can be determined if the golf ball seen by the drone camera is the same as the original picture of the golf ball 745.

Once golf ball 310 is found, the drone relays the information 750 to the drone controller unit 620. The drone controller provides the ball location to pathway unit 240 and pathway unit 240 directs the golf cart to the golf ball 760 by activating motor 130 and steering wheel 150. A drone may also be outfitted with an arm to collect balls that are unreachable or that the user does not wish to retrieve. For instance, a drone outfitted with a scoop arm can scoop a ball out of water or at a location the user does not wish to walk to. Upon command from the user, the drone will retrieve the golf ball and return it to the user.

A pathway to an approximate location of the struck golf ball may be started while the drone 510 is searching for the golf ball. The cart 120 need not remain stationary while the drone 510 searches for the struck golf ball. Once the drone locates the struck golf ball, the pathway can be updated to take the cart to the actual location of the golf ball.

The electronics described as attached to the golf cart may alternatively be on a unit remote from the golf cart. For instance, information may be sent to a tablet or other device and the tablet or other device contains some or all of the functionality to perform the steps and actions described above. In addition, the information may be sent to the cloud and a device or virtual device in the cloud contains some or all of the functionality to perform the steps and actions described above. If some of the electronics are on the golf cart and some are located on another device, then the golf cart and other device are connected communicatively to one another. In addition, information or control functionality, such as the information in maps unit 220 may be stored in a cloud or performed remotely and accessed when needed. Additionally, calculations or process steps, such as those done by pathway unit 240 could be performed remotely or in a cloud and the results sent to controller 140, 610.

Figure 8:
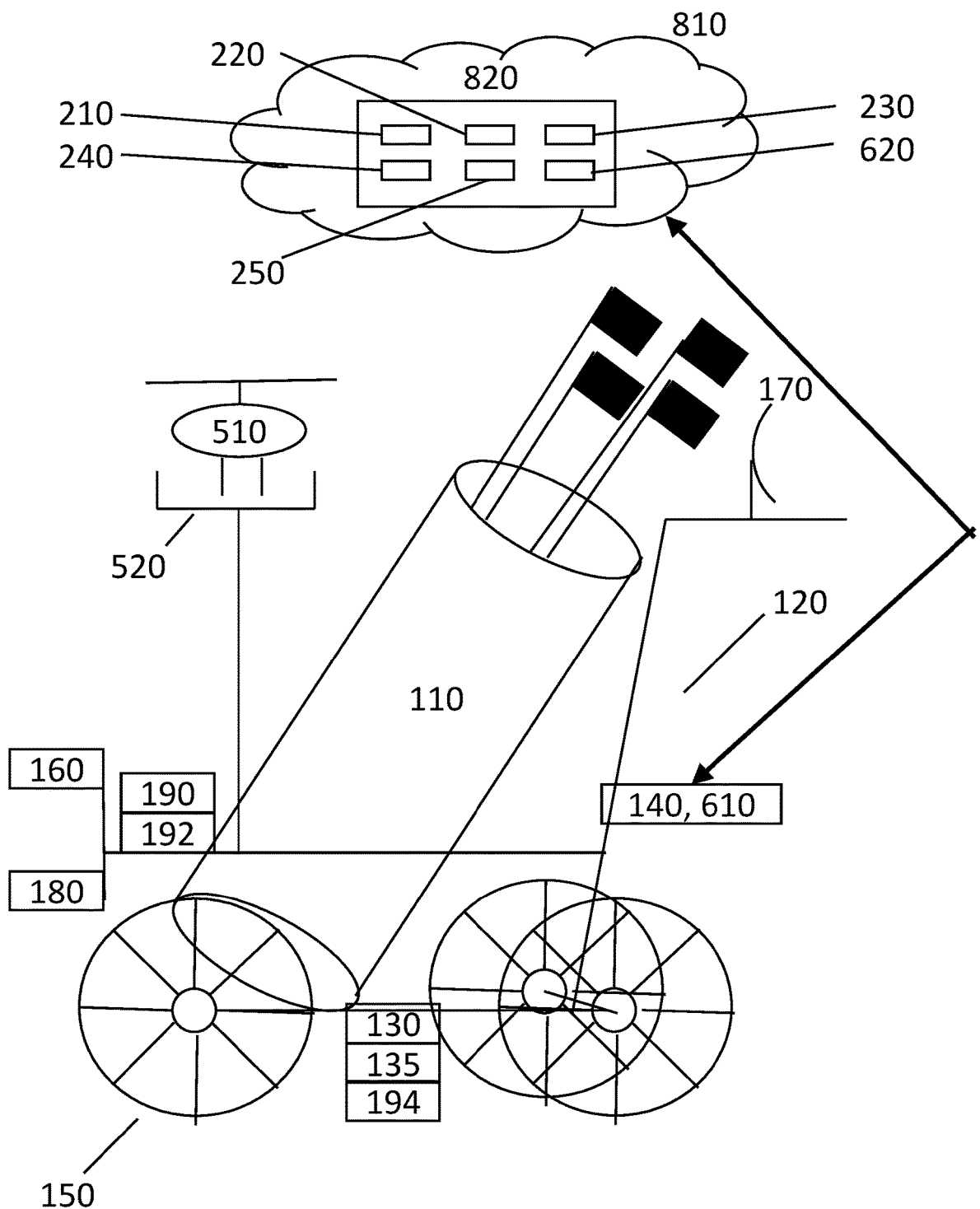
FIG. 8 is a view of a golf cart connected to a controller located in the cloud.

FIG. 8 shows the golf cart connected to a controller 820 located in the cloud or other remote location. The golf cart sends location data and golf ball location or trajectory data (from camera 160 or radar 180) to the controller located in the cloud 810. The controller 820 in the cloud sends pathway and information back to the golf cart 120 via controllers 140, 610. The controller in the cloud 820 also may send commands to the golf cart to cause it to move to the location of a struck golf ball or to where a new ball may be dropped. The controller in the cloud 820 also provides information to screen 170 so that the screen can display the location of the golf ball and the pathway to the golf ball. The controller 140, 610 on the golf cart 120 retains at least enough functionality to augment whatever functionality the controller 820 in the cloud 810 does not perform.

Figure 9:
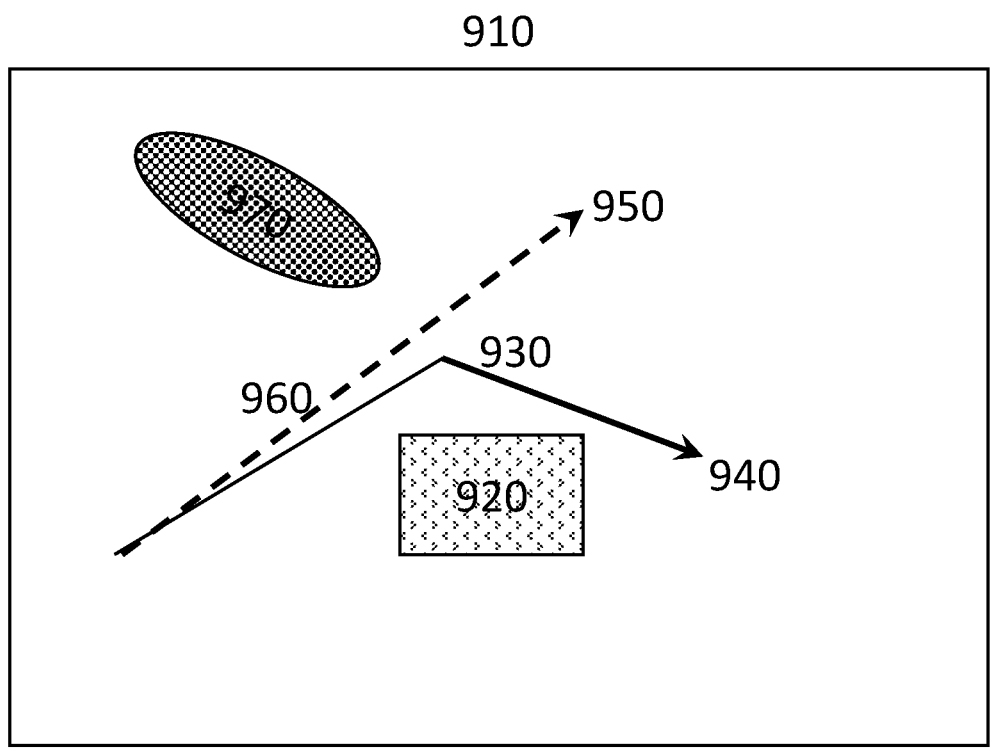
FIG. 9 is an exemplary screen of a pathway to a struck golf ball.

FIG. 9 is an exemplary screen 910 of a pathway 930 to a golf ball location 940. As shown, the pathway is designed to avoid hazards such as sand trap 920 and water 970. The user may change the destination of the pathway to a new destination 950 by touching a location on touch screen 170. The pathway unit 240 will then create a new pathway 960 to the selected location. The controller 140 will then cause the cart to go to the new destination. The screen 170 also has a button 910 to cause a ball to be dropped.

Certain systems, apparatus, applications or processes have been described herein as including a number of units. A unit may be a unit of distinct functionality that may be implemented in software, hardware, or combinations thereof, except for those units which are preferably implemented as hardware or firmware to enable streaming calculations as disclosed herein. When the functionality of a unit is performed in any part through software, the unit can include a non-transitory tangible computer-readable storage medium.

While systems and methods for self propelling a golf cart tethered or paired to a golf ball and determining a pathway to a struck golf ball have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore, it is intended that the claims set forth hereinafter not be limited to the disclosed embodiments.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation. For example, the steps of determining which feature points are common feature points and computing pixel position differences between the common feature points may be performed separately or concurrently.

The invention claimed is:

1. A golf cart including a system for propelling the golf cart comprising:
    a unit to determine a location of a golf ball using a GPS to determine a location of the golf ball before it is struck;
    a unit to determine the location of the golf cart using a GPS to determine the location of the golf cart before the golf ball is struck;
    a golf ball locator unit including at least one of a camera and a radar on the golf cart to determine the location of the golf ball after it is struck configured to:
        A. first determine a location of the golf ball by
            a. receiving a transmission from the golf ball; and
            b. determining the location based on the transmission, and if the location of the golf ball is not determined then
        B. second determine an estimated location of the golf ball by
            (i) first using one of the camera and the radar on the golf cart to estimate a position of the golf ball after it is struck; and
            (ii) second using a drone to search for the golf ball at the estimated position of the golf ball after it is struck;
    a unit to determine a pathway to the golf ball after it is struck configured to use a map of a golf course to determine a pathway to the golf ball after it is struck;
    wherein, when the unit determines that there is no pathway to the golf ball after it is struck, a suggested pathway to a suggested location to legally drop a new golf ball is provided on a screen of the golf cart; and
    a mechanical system including a motor to propel the golf cart to a location based on the location of the golf ball after it is struck.

2. The system of claim 1, wherein the unit to determine a pathway to the golf ball after it is struck provides instructions to the mechanical system to propel the golf cart.

3. The system of claim 2, wherein the unit to determine a pathway to the golf ball after it is struck receives an input from the unit to determine the location of a golf ball informing the unit to determine a pathway to the location of the golf ball after it is struck.

4. The system of claim 3, wherein the unit to determine the location of a golf ball includes a system to determine a flight path of the golf ball.

5. The system of claim 2, wherein the unit to determine a pathway to the golf ball provides instructions to the mechanical system to propel the golf cart to a safe point that is close to the golf ball; and
    the unit to determine the location of a golf ball provides an indication of a location of the golf ball from a current location of the golf cart.

6. The system of claim 1, wherein the unit to determine the pathway to the golf ball after it is struck prepares a pathway to the golf ball that avoids at least one of a sand trap and a water hazard.

7. The system of claim 1, wherein, once the drone arrives at the estimated location of the golf ball and the drone detects that the golf ball is not at the estimated location, the drone uses a grid search with the middle of the grid search being the estimated location of the golf ball.

8. The system of claim 1, wherein the golf ball locator unit additionally uses a thermometer, a wind gauge and a dampness detector to estimate a position of the golf ball after it is struck.

9. The system of claim 1, wherein a screen on the golf cart displays a probability of the location of the golf ball in the form of a heat map.

10. The system of claim 9, wherein the system determines if a golf ball viewed by the drone is the struck golf ball by comparing a picture of the golf ball from a camera of the drone with a photograph of the struck golf ball stored in a memory of the system.

11. The system of claim 1, wherein the drone has an arm arranged to collect golf balls that are unreachable or that a user does not wish to retrieve, and wherein upon a command from the user, the drone retrieves the golf ball and returns it to the user.

12. Method for propelling a golf cart, the method comprising:
    determining a location of a golf ball;
    determining the location of the golf cart;
    determining the location of the golf ball after it is struck including
        A. first determining a location of the golf ball by
            a. receiving a transmission from the golf ball; and
            b. determining the location based on the transmission, and if the location of the golf ball is not determined then
        B. second determining an estimated location of the golf ball by
            (i) first using one of a camera and a radar on the golf cart to estimate a position of the golf ball after it is struck; and
            (ii) second using a drone to search for the golf ball at the estimated position of the golf ball after it is struck;
    determining a pathway to the golf ball after it is struck;
    wherein, when it is determined that there is no pathway to the golf ball after it is struck, a suggested pathway to a suggested location to legally drop a new golf ball is provided on a screen of the golf cart; and
    causing a mechanical system to propel the golf cart to a location based on the location of the golf ball after it is struck.

13. The method of claim 12, wherein determining a pathway to the golf ball after it is struck includes using a map of a golf course.

14. The method of claim 13, further including sending instructions to the mechanical system to propel the golf cart after determining a pathway to the golf ball after it is struck.

15. The method of claim 14, wherein determining a pathway to the golf ball after it is struck includes receiving an input with the location of a golf ball.

16. The method of claim 15, wherein determining the location of a golf ball includes using a flight path of the golf ball.

17. The method of claim 14, including providing instructions to the mechanical system to propel the golf cart to a safe point that is close to the golf ball based on the determined pathway to the golf ball; and providing an indication of a location of the golf ball from a current location of the golf cart based on the determined location of the golf ball.

18. A method to determine a pathway to a golf ball after it is struck, the method comprising:
  determining a location of a golf ball;
  determining the location of a golf cart;
  determining the location of the golf ball after it is struck including:
    A. first determining a location of the golf ball by
      a. receiving a transmission from the golf ball; and
      b. determining the location based on the transmission, and if the location of the golf ball is not determined then
    B. second determining an estimated location of the golf ball by
      (i) first using one of a camera and a radar on the golf cart to estimate a position of the golf ball after it is struck; and
      (ii) second using a drone to search for the golf ball at the estimated position of the golf ball after it is struck; and
  determining a pathway to the golf ball after it is struck wherein, when it is determined that there is no pathway to the golf ball after it is struck, a suggested pathway to a suggested location to legally drop a new golf ball is provided on a screen of the golf cart.

* * * * *